W. B. PEPPER.
HYDRAULIC TRANSMISSION.
APPLICATION FILED NOV. 3, 1913.

1,136,363.

Patented Apr. 20, 1915.
2 SHEETS—SHEET 1.

WITNESSES

INVENTOR
WILLIAM B. PEPPER,
BY Munn & Co.
ATTORNEYS

W. B. PEPPER.
HYDRAULIC TRANSMISSION.
APPLICATION FILED NOV. 3, 1913.

1,136,363.

Patented Apr. 20, 1915.
2 SHEETS—SHEET 2.

WITNESSES
S. E. Wade.
Myron G. Clear.

INVENTOR
WILLIAM B. PEPPER,
BY Munn & Co.
ATTORNEYS

UNITED STATES PATENT OFFICE.

WILLIAM BURTON PEPPER, OF MONTROSE, COLORADO.

HYDRAULIC TRANSMISSION.

1,136,363.              Specification of Letters Patent.       Patented Apr. 20, 1915.

Application filed November 3, 1913. Serial No. 798,872.

*To all whom it may concern:*

Be it known that I, WILLIAM BURTON PEPPER, a citizen of the United States, and a resident of Montrose, in the county of Montrose and State of Colorado, have invented an Improvement in Hydraulic Transmission, of which the following is a specification.

My present invention relates particularly to that character of transmission utilized in connection with automobiles and the like in which power is transmitted from a power shaft to two driven shafts directly connected to the drive wheels of the vehicle, in such manner that the two wheels may assume different speeds under the same pressure, as required by changes in the direction of travel of the vehicle.

The object of my invention is to provide a novel differential transmission unit having a hydraulic action and attaining the desired results, including a wide range of gear ratios, both forward or backward, without the use of either spur or bevel gears.

Figures 1, 2, 3:
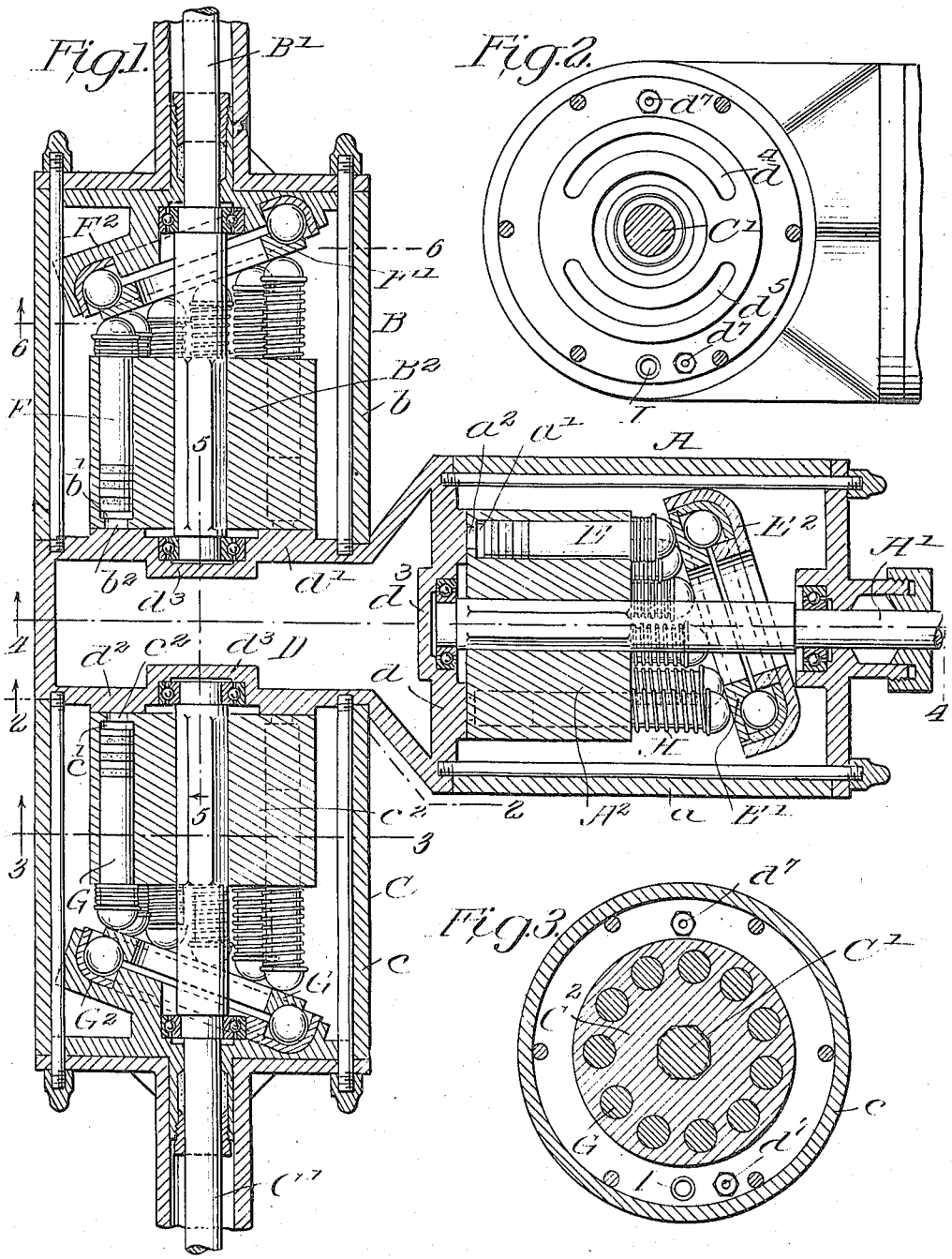
Figure 4:
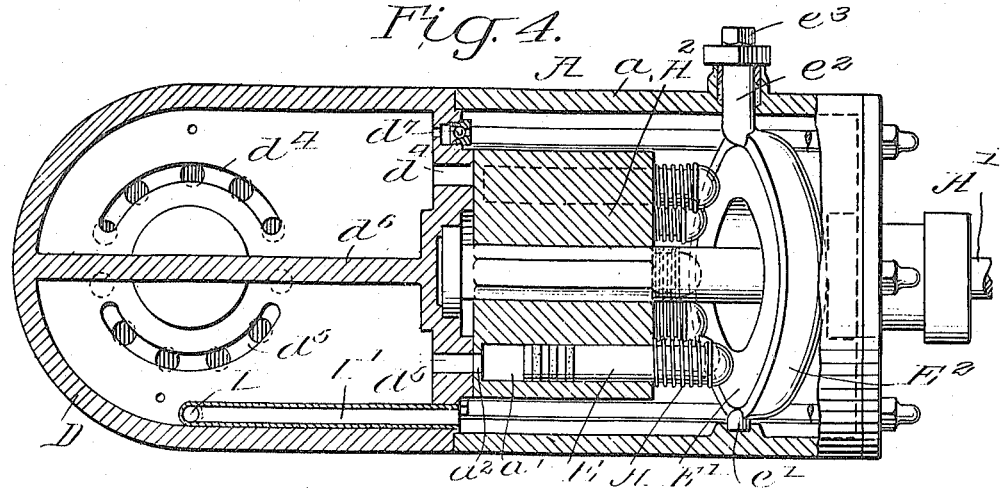
Figure 5:
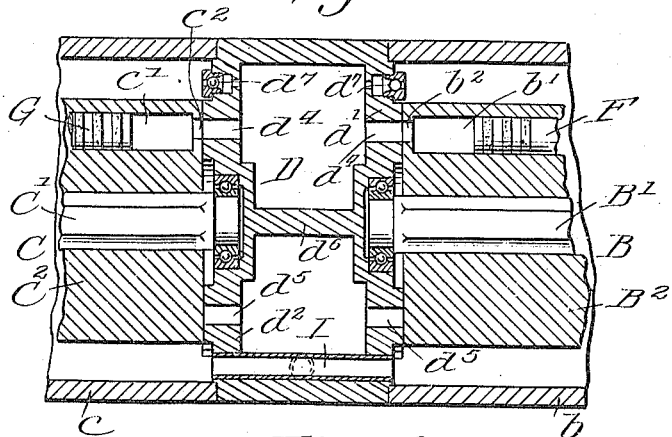
Figure 6:
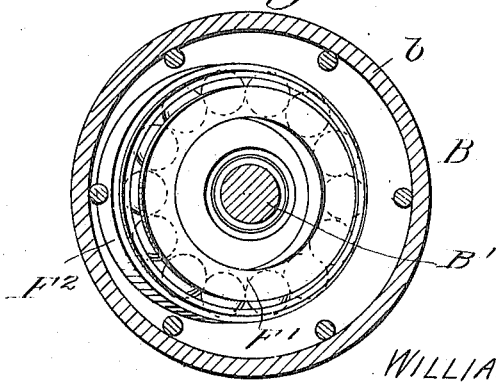

In the accompanying drawings, which illustrate my invention, Figure 1 is a horizontal section through the axle unit constructed in accordance with my invention. Fig. 2 is a detail vertical longitudinal section taken therethrough substantially on line 2—2 of Fig. 1. Fig. 3 is a similar view taken therethrough substantially on line 3—3 of Fig. 1. Fig. 4 is a vertical longitudinal section taken through the entire unit substantially on line 4—4 of Fig. 1. Fig. 5 is a vertical transverse detail section taken substantially on line 5—5 of Fig. 1, and, Fig. 6 is another detail vertical section taken substantially on line 6—6 of Fig. 1.

Referring now to these figures, the transmission unit constructed in accordance with my invention is divided into three members, namely the driving member A and driven members B and C, the latter forming the left and right differential halves respectively. The cylinder $a$ forming the casing of the driving member A is rigidly connected to the forward end $d$ of a valve chest D, and the inner ends of the cylinders $b$ and $c$ respectively forming the casings of the driven members B and C are likewise connected at their inner ends to the sides $d'$ and $d^2$ respectively of the said valve chest.

The outer closed ends of the cylinders $a$, $b$ and $c$ are provided with central stuffing boxes through which their respective shafts A′, B′, and C′ extend, and the inner end $d$ and sides $d'$ and $d^2$ of the valve chest D are provided with recesses $d^3$ axially alined with the stuffing boxes to receive the inner reduced extremities of the shafts, these shafts, as will be seen particularly from Fig. 1, being provided adjacent their said inner reduced extremities with octagonal portions upon which the respective driving and driven blocks A$^2$, B$^2$, and C$^2$ are disposed. The driving and driven blocks A$^2$, B$^2$, and C$^2$ are provided with a circular series of piston bores $a'$, $b'$, and $c'$ formed therein from their outer ends and the inner ends of which have small ports $a^2$, $b^2$, and $c^2$ adapted to communicate with the interior of the valve chest D during operation through curved slots $d^4$ and $d^5$ in the sides and forward end thereof respectively above and below a central horizontal partition $d^6$ dividing the same into upper and lower compartments.

Within the piston bores are arranged series of pistons E, F, and G having their outer ends provided with hardened rounded heads respectively contacting with bearing rings E′, F′, and G′ disposed around the respective shafts and supported in the bearing cups E$^2$, F$^2$, and G$^2$, it being noted that the cups F$^2$ and G$^2$ of the driven members B and C respectively are stationarily secured within the outer ends of the respective cylinders $b$ and $c$ and properly inclined with respect to the axis of the driven shafts B′ and C′. It is also to be noted that the bearing cup E$^2$ of the driving member A is supported by means of trunnions $e$ and $e'$ extending from diametrically opposite points and forming a supporting pivot substantially in the plane of the inner bearing surface of its ring E′, the trunnion $e^2$ being elongated and extended through a fluid-tight bearing in casing $a$ and provided with a squared end $e^3$ upon which a suitable tool may be engaged in order to vary the inclination of the bearing cup with respect to the driving shaft A′ as desired.

Each of the pistons E, F and G, is provided with a spring H coiled thereabout and compressed between its outer rounded head before mentioned and the outer surface of its respective piston block, tending to urge the outer headed end away from the piston block and thus move the piston out of its bore.

The side walls $d'$ and $d^2$ of the valve chest

D and its front end $d$ are also provided with ports communicating with the space surrounding the piston blocks $B^2$ and $C^2$ in which ports are located outwardly closing check valves $d^7$, the spaces mentioned surrounding the piston blocks $B^2$ and $C^2$ being also connected by a closed pipe I extending through the base of the valve chest D and having an intermediate forwardly extending branch I' communicating with the space surrounding the piston block $A^2$.

In describing the operation of my improved transmission unit it should be stated that the entire mechanism is submerged in oil but only the oil in the valve chest and cylinders is ever subject to heavy pressure, and any oil leaking past the pistons and valves is replenished during the operation through the check valves $d^7$ before mentioned. Power is applied from the motor or other suitable power plant to the driving shaft A' and through the piston block $A^2$ to the pistons E and through the oil, or other fluid medium, through ports $d^4$ or $d^5$ to the pistons F and G and from these pistons through the piston blocks $B^2$ and $C^2$, to the driven shafts B' and C', thus delivering the power to the traction wheels of the vehicle which are of course directly connected to the said shafts B' and C'.

The differential effect of this mechanism is due to the fact that the pressure being equal in all directions on the oil or fluid, therefore exerts an equal pressure on the pistons and other driven parts in the members B and C, and thus causes these driven parts in members B and C to revolve in accordance with the resistance to be overcome, all parts in members B and C being of equal dimensions. For instance, if there is more resistance at driven member B than at driven member C, the driven parts in B cease to work either partially or wholly as the case may be, and the driven parts in the member C revolve correspondingly faster, the fluid being simply pumped into the more freely moving parts following the course of least resistance whereby to get the same differential effect as is obtained by the ordinary geared differential.

The speed variations between the driving and driven members is accomplished by virtue of the adjustability of the bearing cup $E^2$ of the driving member A through its extended trunnions $e^2$, when this bearing cup is at an angle, other than a right angle, with respect to driving shaft A', the pistons E are caused to reciprocate in their bores as they revolve with the driving shaft. This causes the fluid in the several piston bores to be discharged as the pistons descend the inclined plane presented by the inner surface of the bearing ring E' with which their outer ends are in contact, and serves to recharge the piston bores as the pistons ascend the inclined plane. As the angle of deflection of the bearing cup $E^2$ more nearly approaches 90° with respect to the shaft A', the less will be the reciprocation of the pistons E and therefore the less discharge and recharge of fluid in the piston bores, the 90° or right angular position of the bearing ring be the at rest position. After passing the 90° or at rest position, the action is reversed, the half of the series of pistons E formerly discharging oil, being now engaged in recharging their bores and the other half formerly engaged in recharging being now discharging whereby the direction of rotation of the driven parts is reversed.

The angle of deflection of the bearing cups $F^2$ and $G^2$ is equal to the maximum angle of deflection of the bearing cup $E^2$, whereby when the latter bearing member is fully deflected there is a ratio in speed between the driving shaft A' and the driven shafts B' and C' of two to one, all pistons and cylinders being of equal bore and structure, and as the angle of deflection of bearing cup $E^2$ is reduced, the number of strokes of pistons E required to fill the piston bores b' and c' will be correspondingly increased and therefore a greater number of revolutions of the driving shaft will be required to cause a single revolution of the driven shafts B' and C'.

The valve chest D being horizontally divided into upper and lower compartments, allows one-half thereof to be under pressure while the other half is under suction so that in operation when the parts are rotating in one direction, the fluid will be pumped through slots $d^4$ above the partition $d^6$ and sucked through slots $d^5$ and when the parts are rotating in the opposite direction the pumping of the fluid will take place through slots $d^5$ below the partition $d^6$ and sucked through the slot $d^4$ above the partition. In this manner the same oil is used over and over being simply transferred in turn from one piston and from one cylinder to another and I am enabled to provide a simple, inexpensive, and highly effective arrangement which fully conforms to the requirements of the objects before stated.

I claim:—

1. A transmission unit of the character described, comprising the combination of driving and driven members consisting of cylinders, driving and driven shafts projecting within the said cylinders, piston blocks carried by the shafts within the cylinders and having piston bores surrounding the shafts and communicating through the inner ends of the cylinders, a valve chest to opposite sides of which the cylinders of the driven members are connected and to the forward end of which the cylinder of the driving member is connected, said valve chest having a central horizontal partition dividing the same into upper and lower compartments and having curved slots in its sides and front end establishing communication between the piston bores of the driving and driven members through the said upper and lower compartments, pistons movable in the piston bores of the driving and driven members and having outer headed bearing ends and springs for moving them in one direction, bearing rings inclined within the cylinders and against which the outer ends of said pistons engage, the bearing ring of the driving cylinder having trunnions one of which projects exteriorly through its cylinder whereby the inclination of the ring may be adjusted, pressure equalizing pipes extending through the valve chest and connecting the driving and driven cylinders, and check valves arranged in the side, walls, and front end of the valve chest and opening into the driving and driven cylinders whereby to automatically replenish the motive fluid in the valve chest and piston bores when necessary.

2. A transmission unit of the character described, comprising the combination of driving and driven members consisting of cylinders, driving and driven shafts projecting within said cylinders, piston blocks carried by the shafts within the cylinders and having piston bores surrounding the shafts and communicating through the inner ends of the cylinders, a valve chest to opposite sides of which the cylinders of the driven members are connected and to the front end of which the cylinder of the driving member is connected, said valve chest having a central horizontal partition dividing the same into upper and lower compartments and having curved slots in its sides and front end establishing communication between the piston bores of the driving and driven members through the said upper and lower compartments, pistons movable in the piston bores of the driving and driven members and having outer headed bearing ends and springs for moving them in one direction, and bearing rings inclined within the cylinders and against which the outer ends of said pistons engage, the bearing ring of the driving cylinder having trunnions one of which projects exteriorly through its cylinder, whereby the inclination of the ring may be adjusted, all for the purpose described.

WILLIAM BURTON PEPPER.

Witnesses:
  CORA MELLON,
  F. J. HARTMAN, Jr.